(12) United States Patent
Tsuchida

(10) Patent No.: US 11,394,110 B2
(45) Date of Patent: Jul. 19, 2022

(54) ANTENNA AND RFID TAG ISSUING APPARATUS

(71) Applicant: TOSHIBA TEC KABUSHIKI KAISHA, Tokyo (JP)

(72) Inventor: Sunao Tsuchida, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 16/902,667

(22) Filed: Jun. 16, 2020

(65) Prior Publication Data
US 2021/0075097 A1  Mar. 11, 2021

(30) Foreign Application Priority Data
Sep. 6, 2019 (JP) .............................. JP2019-163200

(51) Int. Cl.
| | | |
|---|---|---|
| *G06K 19/06* | (2006.01) | |
| *H01Q 1/38* | (2006.01) | |
| *G06K 19/07* | (2006.01) | |
| *H01Q 1/22* | (2006.01) | |
| *H01Q 1/48* | (2006.01) | |
| *H01Q 1/50* | (2006.01) | |

(52) U.S. Cl.
CPC ........... *H01Q 1/38* (2013.01); *G06K 19/0726* (2013.01); *H01Q 1/2208* (2013.01); *H01Q 1/48* (2013.01); *H01Q 1/50* (2013.01)

(58) Field of Classification Search
CPC ......... G06K 19/0726; G06K 19/07786; H01Q 1/2208; H01Q 1/2225; H01Q 1/38; H01Q 1/48; H01Q 1/50; H01Q 9/42
See application file for complete search history.

(56) References Cited

U.S. PATENT DOCUMENTS

| | | | | |
|---|---|---|---|---|
| 5,945,959 | A * | 8/1999 | Tanidokoro | H01Q 1/38 343/728 |
| 2007/0229366 | A1* | 10/2007 | Kim | H01Q 1/243 343/700 MS |
| 2008/0007457 | A1 | 1/2008 | Copeland et al. | |
| 2011/0128125 | A1* | 6/2011 | Kai | H01Q 11/18 340/10.1 |
| 2012/0194392 | A1* | 8/2012 | Inoue | H01Q 9/0421 343/700 MS |

(Continued)

FOREIGN PATENT DOCUMENTS

| | | |
|---|---|---|
| CN | 106602284 A | 4/2017 |
| WO | 9627219 A1 | 9/1996 |

OTHER PUBLICATIONS

Extended European Search Report dated Feb. 5, 2021, mailed in counterpart European Application No. 20190035.4, 11 pages.

*Primary Examiner* — Thien M Le
(74) *Attorney, Agent, or Firm* — Kim & Stewart LLP

(57) ABSTRACT

According to one or more embodiments, an antenna comprises a dielectric substrate, a line formed on a first surface of the dielectric substrate, and a ground layer formed on a second surface of the dielectric substrate. A maximum width of the line in a first direction of the first surface is greater than a maximum width of the line in a second direction orthogonal to the first direction. A width of the ground layer in the second direction is equal to the maximum width of the line in the second direction.

20 Claims, 9 Drawing Sheets

(56) References Cited

U.S. PATENT DOCUMENTS

| | | | |
|---|---|---|---|
| 2013/0015959 A1* | 1/2013 | Sano | G06K 1/20 340/10.51 |
| 2015/0061406 A1* | 3/2015 | Ono | H04B 1/0057 307/112 |
| 2016/0315390 A1* | 10/2016 | Oh | H01Q 9/42 |
| 2017/0098897 A1* | 4/2017 | Sharawi | H01Q 1/243 |
| 2019/0260108 A1 | 8/2019 | Davis | |
| 2020/0373655 A1* | 11/2020 | Takayama | H01Q 1/40 |

\* cited by examiner

ANTENNA AND RFID TAG ISSUING APPARATUS

CROSS-REFERENCE TO RELATED APPLICATIONS

This application is based upon and claims the benefit of priority from Japanese Patent Application No. 2019-163200, filed on Sep. 6, 2019, the entire contents of which are incorporated herein by reference.

FIELD

Embodiments described herein relate generally to an antenna and an RFID tag issuing apparatus.

BACKGROUND

In order to manage products and the like, a technology using a radio frequency identification (RFID) tag has been used. Such an RFID tag is, for example, provided on an adhesive label and attached to a product via the label. The RFID tag may be issued by an RFID tag issuing apparatus that has an antenna of a tag reader/writer arranged, for example, along a conveyance path for carrying a label within the issuing apparatus. Recently, downsizing of the RFID tag issuing apparatus has been demanded by customers and the like. For this reason, the size of the antenna has been reduced in order to reduce the size of the RFID tag issuing apparatus. However, when the antenna is made smaller, a radio wave emitted therefrom may be weakened and likewise a smaller antenna may not receive signals as well as a larger one.

Hence, there is a need for an antenna capable of suitably emitting a radio wave even when the antenna is small in size.

DETAILED DESCRIPTION

According to one or more embodiments, an antenna comprises a dielectric substrate, a line formed on a first surface of the dielectric substrate, and a ground layer formed on a second surface of the dielectric substrate. A maximum width of the line in a first direction of the first surface is greater than a maximum width of the line in a second direction orthogonal to the first direction. A width of the ground layer in the second direction is equal to the maximum width of the line in the second direction.

Figure 1:
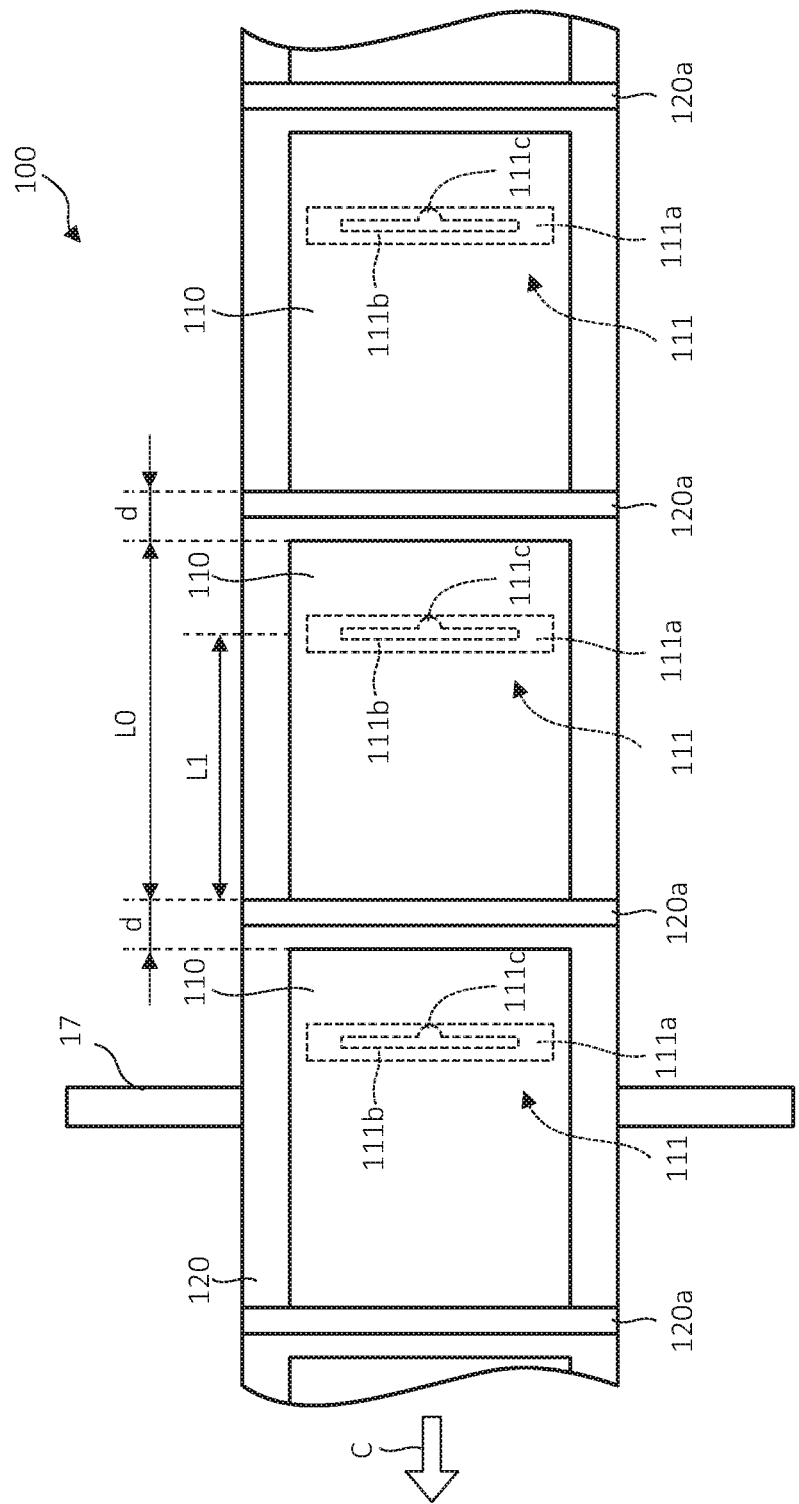
FIG. 1 depicts a configuration of a label paper used in an RFID tag issuing apparatus according to an embodiment.
Figure 2:
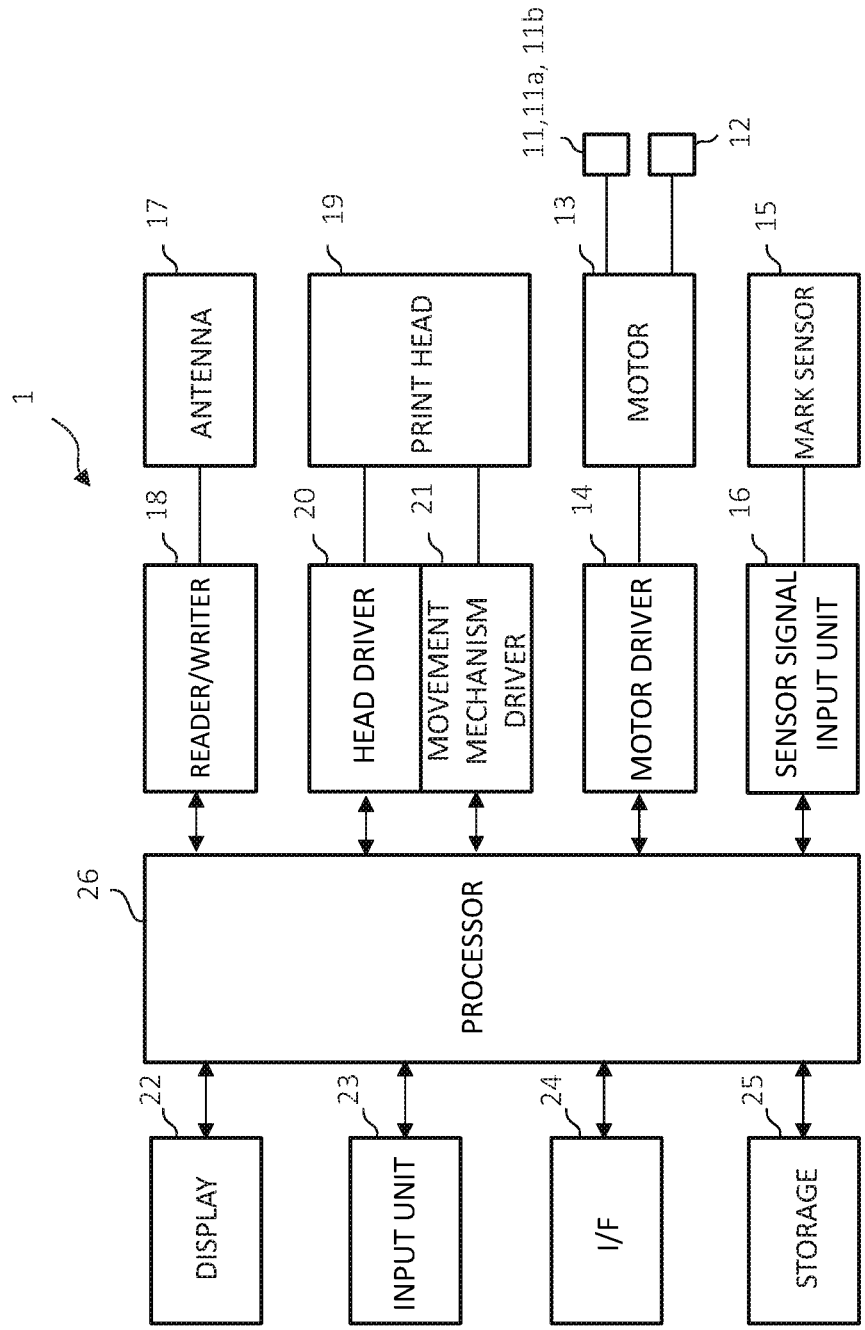
FIG. 2 is a block diagram of an RFID tag issuing apparatus according to an embodiment.
Figure 3:
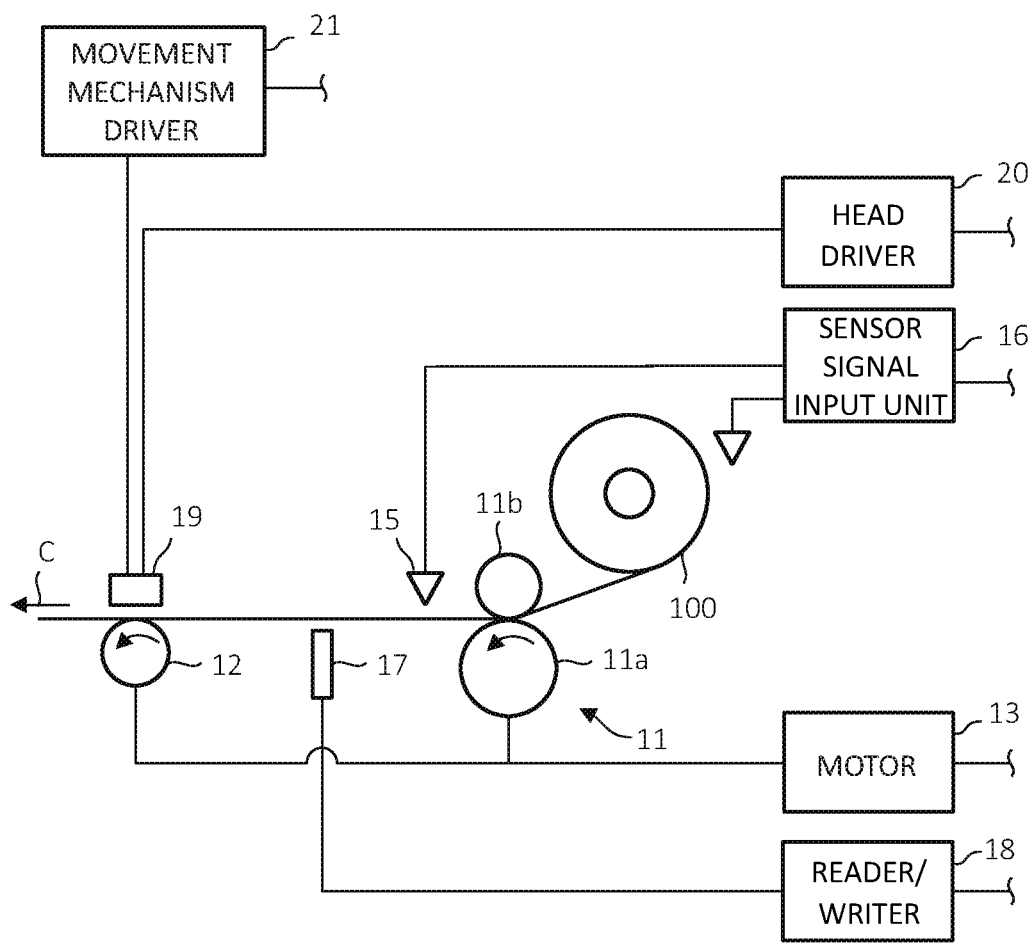
FIG. 3 depicts a partial block diagram and a partial configuration of an RFID tag issuing apparatus according to an embodiment.
Figure 4:
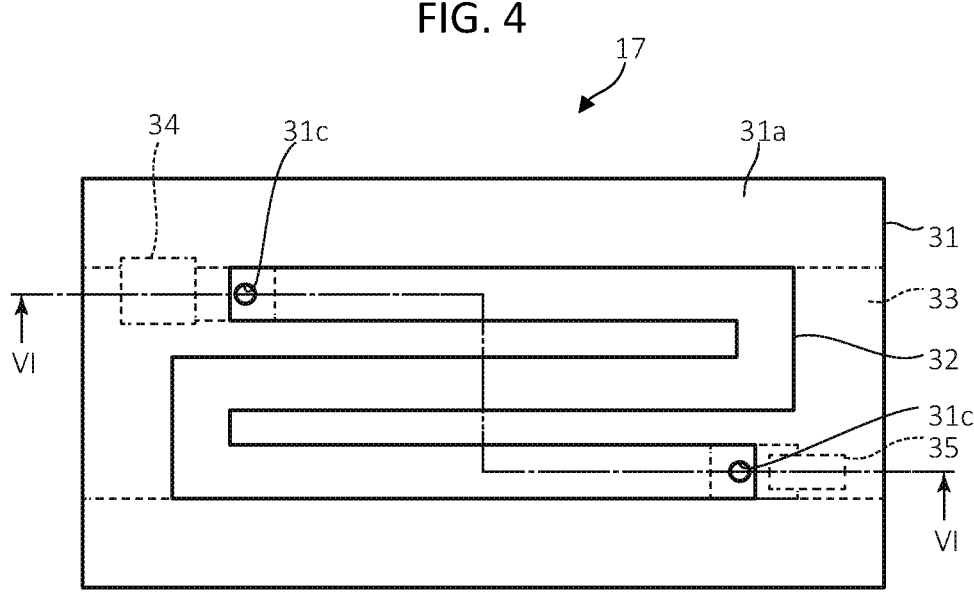
FIG. 4 depicts a configuration of an antenna of an RFID tag issuing apparatus in a plan view according to an embodiment.
Figure 5:
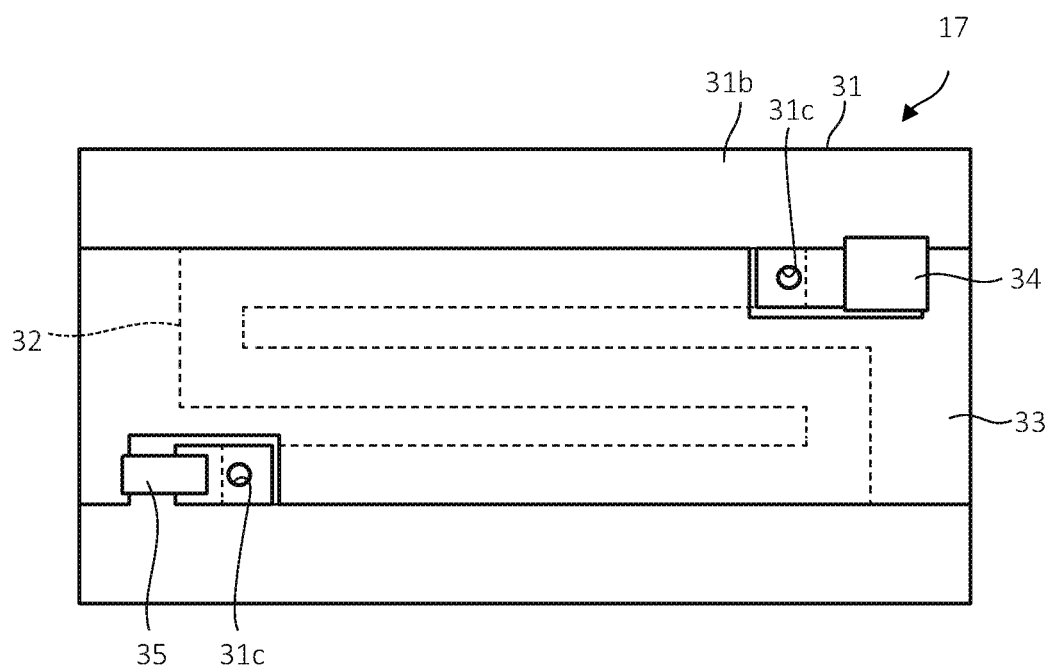
FIG. 5 depicts a configuration of an antenna in a plan view according to an embodiment.
Figure 6:
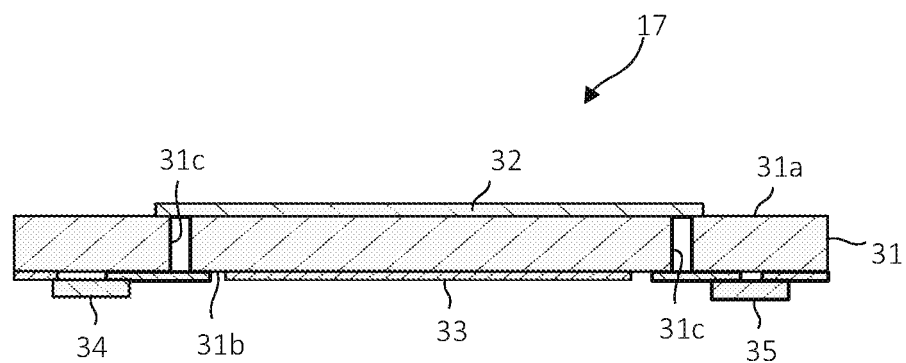
FIG. 6 depicts a configuration of an antenna in a cross-sectional view according to an embodiment.
Figure 7:
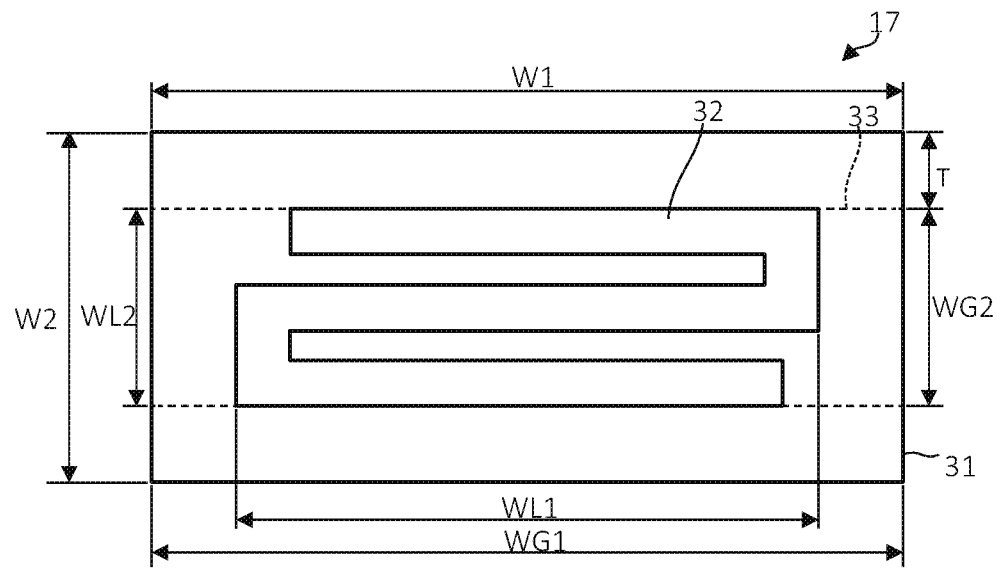
FIG. 7 depicts a dielectric substrate, a line, and a ground layer of an antenna according to an embodiment.
Figure 8:
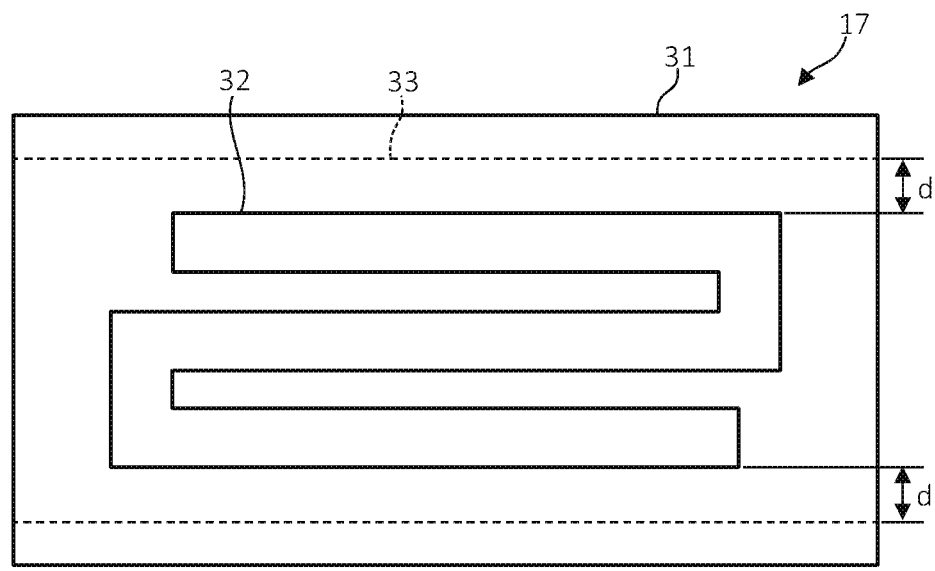
FIG. 8 depicts a line and a ground layer of an antenna according to an embodiment.
Figure 9:
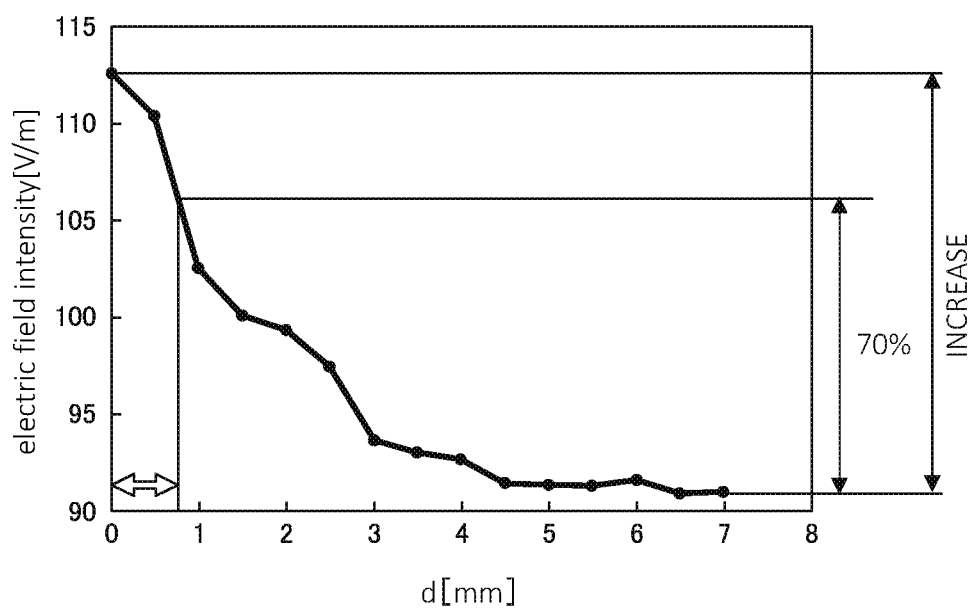
FIG. 9 shows an example of a relationship between a configuration of an antenna and an electric field intensity according to an embodiment.

Hereinafter, an example embodiment will be described with reference to FIGS. 1 to 9. FIG. 1 is an explanatory diagram illustrating a configuration of a label paper 100 used in an RFID tag issuing apparatus 1 according to the embodiment. FIG. 2 is a block diagram illustrating a configuration of the RFID tag issuing apparatus 1, and FIG. 3 is an explanatory diagram illustrating some components of the RFID tag issuing apparatus 1. FIG. 4 is a plan view illustrating the configuration of an antenna 17 of the RFID tag issuing apparatus 1 from a first surface 31a side, and FIG. 5 is a plan view showing the configuration of the antenna 17 from a second surface 31b side. FIG. 6 is a cross-sectional view taken along line VI-VI in FIG. 4, illustrating the configuration of the antenna 17. FIG. 7 is an explanatory view illustrating the relationship between a dielectric substrate 31, a line 32, and a ground layer 33 of the antenna 17. FIG. 8 is an explanatory view illustrating a relationship between the line 32 and the ground layer 33 of the antenna 17, and FIG. 9 is an explanatory diagram illustrating an example of a relationship between the configuration of the antenna 17 and an electric field intensity.

In this embodiment, the antenna 17 is applied to the RFID tag issuing apparatus 1 that issues an RFID tag 111 attached to a label 110.

First, the label paper 100 used in the present embodiment will be described with reference to FIG. 1. The label paper 100 includes a plurality of labels 110 and a mount 120 to which the plurality of labels 110 are initially attached. Each of the plurality of labels 110 contains the RFID tag 111. The label paper 100, more particularly the mount 120, may be provided as a roll or a continuous sheet.

Each label 110 has a rectangular shape. The plurality of labels 110 are attached to one surface of the mount 120. The plurality of labels 110 are arranged at a constant interval D in the longitudinal direction. Each label 110 has an adhesive surface on a surface facing the mount 120.

Each label 110 has one RFID tag 111 provided on the adhesive surface. The RFID tag 111 includes a film 111a, a tag antenna 111b, and an IC chip 111c. The tag antenna 111b includes, for example, a matching circuit (or a loop unit). The tag antenna 111b and the IC chip 111c are disposed on the film 111a. In this example, the RFID tag 111 is a passive tag that does not have a battery.

The attachment position of the RFID tag 111 to the label 110 can be appropriately set depending on the type of the label paper 100. In the example illustrated in FIG. 1, L0 is an entire length of a label 110 on the label paper 100 along a conveyance direction C, and L1 is a distance along the conveyance direction C from a leading edge (also referred to as a first side end) of the label 110 to the RFID tag 111 on the label 110. The RFID tag 111 is arranged on the label 110 at a distance L1 from the leading edge of the label 110. That is, the distance L1 is less than the entire length L0 (i.e., L1<L0). Further, the RFID tag 111 is disposed on the label 110 such that the long dimension of the tag antenna 111b in the RFID tag 111 is substantially orthogonal to the conveyance direction C.

The mount 120, for example, has a plurality of marks 120a in a region adjacent to the leading edge of the label 110 in the conveyance direction C. Each mark 120a corresponds to a head (or a beginning) position of a label 110 in the conveyance direction C. The region where the mark is provided is on a main surface of the label paper 100 (to which the label 110 is attached) and is within a gap between the neighboring labels 110. Each mark 120a has, for example, a width in the conveyance direction C less than the gap between the neighboring labels 110.

The label paper 100 in this example has a roll shape formed by winding the mount 120 with the plurality of labels 110 thereon.

Next, the RFID tag issuing apparatus 1 according to the present embodiment will be described. As shown in FIGS. 2 and 3, the RFID tag issuing apparatus 1 comprises a conveyance roller 11, a platen roller 12, a motor 13, a motor driver 14, a mark sensor 15, a sensor signal input unit 16, an antenna 17, a reader/writer 18, a print head 19, a head driver 20, a movement mechanism driver 21, a display 22, an input unit 23, a communication interface (I/F) 24, a storage unit 25, and a processor 26.

The conveyance roller 11 comprises, for example, a pair of rollers 11a and 11b. The conveyance roller 11 conveys the roll-shaped label paper 100 along a conveyance path in the conveyance direction C. The conveyance roller 11 may comprise a plurality of rollers provided on the conveyance path. One of the rollers 11a and 11b is, for example, a drive roller which is driven by the motor 13, and the other roller is a driven roller.

The platen roller 12 rotates to convey the label paper 100 along the conveyance path in the conveyance direction C. The platen roller 12 is arranged on the second side of the conveyance roller 11 and the mark sensor 15 in the conveyance path. For example, the platen roller 12 is driven to rotate by the motor 13. The platen roller 12 may comprise a plurality of rollers arranged in a similar manner to the above configuration.

The motor 13 is mechanically connected to the conveyance roller 11 and to the platen roller 12. The motor 13 rotates the conveyance roller 11 and the platen roller 12. In one embodiment, the motor 13 rotates the roller 11a of the conveyance roller 11 and the platen roller 12 in the direction indicated by the arrow in FIG. 3 to convey the label paper 100 along the conveyance path.

The motor driver 14 (see FIG. 2) controls the rotation of the motor 13. In addition, the motor driver 14 controls the forward rotation and the reverse rotation of the motor 13. The motor driver 14 controls the motor 13 in the normal, forward rotation, thereby rotating the conveyance roller 11 and the platen roller 12 in the direction indicated by the arrow in FIG. 3, and transporting the label paper 100 in the conveyance direction C.

The mark sensor 15 is provided facing the conveyance path. The mark sensor 15 is arranged on the downstream side of the conveyance roller 11 and on the upstream side of the platen roller 12 along the conveyance path. The mark sensor 15 optically detects, for example, the mark 120a on the mount 120. The mark sensor 15 scans the surface of the label paper 100 being conveyed in the conveyance direction C and detects the mark 120a. The mark sensor 15 outputs the detected information as a signal to the sensor signal input unit 16.

The sensor signal input unit 16 can be connected to various sensors including the mark sensor 15. The sensor signal input unit 16 receives signals from the various sensors and outputs the signals to the processor 26. Here, the various sensors include an open/close sensor for detecting opening and closing of a member or a component of the RFID tag issuing device 1 that will be opened or closed, for example when replacing the label paper 100. Such a member or component is, for example, a cover, a door, a lid, or the like. An example of an open/close sensor may be an optical sensor that turns on in response to closing or opening of the above member. In another example, the open/close sensor may be a mechanical switch that switches on and off in response to closing and opening of the member. The open/close sensor may comprise a detection unit that detects closing and opening of the openable member that is opened and closed to exchange the RFID tags 111 to be conveyed in the RFID tag issuing apparatus 1.

As shown in FIGS. 4 to 7, the antenna 17 includes a dielectric substrate 31, a line 32, a ground layer 33, a feeding point 34 (also referred to as a power feeding point in some contexts), and a termination resistor 35.

The dielectric substrate 31 is formed of a dielectric material. The dielectric substrate 31 has a rectangular plate shape. In one example, the dielectric substrate 31 has a rectangular plate shape in which a width W1 in a first direction is greater than a width W2 in a second direction along a main surface direction of the dielectric substrate 31 orthogonal to the first direction. The rectangular plate shape is thus long in one direction. In addition, the dielectric substrate 31 has a plurality of via holes 31c, each of which penetrates through a first surface 31a as one main surface and a second surface 31b as another main surface of the dielectric substrate 31. The via holes 31c are disposed on both ends of the line 32.

The line 32 is formed on the first surface 31a of the dielectric substrate 31. A first end of the line 32 is disposed on one side of the dielectric substrate 31, and the second end of the line 32 is disposed on the other side of the dielectric substrate 31 opposite in in the first direction. Here, the first direction refers to a direction along the main surface of the dielectric substrate 31. In the present embodiment, the first direction is the longitudinal direction (longer dimension) of the dielectric substrate 31.

As shown in FIG. 7, for the line 32, the maximum width WL1 in the first direction is set to be greater than the maximum width WL2 in a second direction orthogonal to the first direction along the main surface of the dielectric substrate 31. For example, the maximum width WL1 of the line 32 in the first direction is set to be equal to or less than the width W1 of the dielectric substrate 31 in the first direction, and the maximum width WL2 of the line 32 in the second direction is less than the width W2 of the dielectric substrate 31 in the second direction.

In one example, as shown in FIGS. 4, 5, and 7, the line 32 has a shape that bends 90 degrees at four positions, turns two times, and extends in the first direction in three portions.

In the depicted example, the line 32 extends linearly in the first direction from a first end side towards a second end side of the dielectric substrate 31. The line 32 then bends 90 degrees, extends briefly in the second direction, then bends another 90 degrees to extend again in the first direction (this time back towards the first end side of the dielectric substrate 31). The line then bends 90 degrees, extends briefly again in the second direction. The line 32 then bends another 90 degrees to extend again in the first direction (this time back towards the second end side.

The ground layer 33 is provided on a second surface 31b. The second surface 31b is the other main surface of the dielectric substrate 31. The ground layer 33 is provided, for example, in the region of the second surface 31b corresponding to the line 32 provided on the first surface 31a. The ground layer 33 has a rectangular shape.

As shown in FIG. 6, when the feeding point 34 and the termination resistor 35 are provided on the second surface 31b of the dielectric substrate 31, the ground layer 33 is provided so as to avoid the region around the feeding point 34, the termination resistor 35, and the via hole 31c. Alternatively, if the feeding point 34 and the termination resistor 35 are provided on the first surface 31a of the dielectric substrate 31, for example, the ground layer 33 may be provided in a region around the via hole 31c of the first surface 31a of the dielectric substrate 31 and the via hole 31c.

For the ground layer 33, its width WG1 in the first direction is set to be equal to or greater than the maximum width WL1 of the line 32 and also is set to be equal to or less than the width W1 of the dielectric substrate 31 in the first direction. In the present embodiment as shown in FIG. 7, the ground layer 33 has the width WG1 that is the same width as the width W1 of the dielectric substrate 31. Further, the ground layer 33 has a width WG2 in the second direction that is the same width as the maximum width WL2 of the line 32 in the second direction and is less than the width W2 of the dielectric substrate 31 in the second direction.

As depicted in FIGS. 4, 5, and 7, the width WG2 of the ground layer 33 and the width WL2 of the line 32 are the same, but the present disclosure is not limited to this and these widths need not be exactly equal to one another, but rather may be substantially or approximately equal to each other without being exactly equal to one another.

Furthermore, in some examples, the width WG2 the width WG2 can be somewhat greater than the maximum width WL2 of the line 32. Thus, in this context, "substantially equal" encompasses the width WG2 being larger than the maximum width WL2, for example, is the width WG2 relative to the maximum width WL2 being a dimension for which an increase in electric field intensity of antenna 17 is 70% or more.

In this context, a "70% increase in electric field intensity" refers to 70% of the total change between the electric field intensity from the antenna 17 when the width WG2 is exactly equal to the maximum width WL2 and the lowest electric field intensity of the antenna 17 when the width WG2 of the ground layer 33 is made increasingly greater than the maximum width WL2.

An "increase in electric field intensity" will be described by using an example of a relationship between the configuration of the antenna 17 and the electric field intensity illustrated in FIGS. 8 and 9. FIG. 8 is an explanatory diagram schematically illustrating a relationship between the maximum width WL2 of the line 32 and the width WG2 of the ground layer 33 in the second direction, and FIG. 9 is an explanatory diagram illustrating the calculated performance of the different configurations of the antenna 17, (that is, the changes in configuration with respect to the relationship between the maximum width WL2 of the line 32 and the width WG2 of the ground layer 33) according to the electric field intensity calculated by an electromagnetic field simulator.

Note that the conditions for calculating the electric field intensity in the electromagnetic field simulator according to the present example are the following. The width W1 of the dielectric substrate 31 is 50 mm, the width W2 of the dielectric substrate 31 is 30 mm, and the maximum width WL2 of the line 32 is 16 mm. Further, the width WG2 of the ground layer 33 is set as WG2=WL2+2d, and d is increased in increments of 0.5 mm from d=0 to d=7 mm, and the electric field intensity at a position separated by 15 mm from the center of the antenna 17 is calculated.

As illustrated in FIG. 9, the electric field intensity of the antenna 17 in the present example has the highest electric field intensity when d=0 mm, i.e., WG2=WL2, and the electric field intensity decreases as d increases. After d=4 mm, change in the electric field intensity becomes substantially level, and at d=6.5 mm, it reaches the smallest value.

Therefore, in this context, the "increase in electric field intensity" is taken as the difference between the electric field intensity at d=0 mm and the electric field intensity at d=6.5 in the present example. Thus, the "70% increase in electric field intensity" means 70% of that overall (total) difference. For example, based on the calculation, d is around 0.8 mm when the electric field intensity becomes 70% of the total difference between the electric field intensity at d=0 mm and the electric field intensity at d=6.5 mm.

In the present example, the width WG2 of the ground layer 33 with respect to the maximum width WL2 of the line 32 that achieves the "increase in electric field intensity" of 70% or more has the range of 16 mm WG2 17.6 mm. This indicates that the width WG2 of the ground layer 33 is about 100% to 110% with respect to the maximum width WL2 of the line 32.

As described above, the width WG2 of the ground layer 33 in the second direction being the same as the maximum width WL2 of the line 32 in the second direction is allowed to be substantially equal to the maximum width WL2 of the line 32 so long as the increase in electric field intensity is equal to or greater than 70%.

Turning now to other features of the antenna 17 as shown in FIG. 6, the antenna 17 further comprises the feeding point 34 provided at a position adjacent to the via hole 31c of the second surface 31b of the dielectric substrate 31 in the first direction. The feeding point 34 is connected to one end of the line 32 through the via hole 31c. A part of the feeding point 34 is connected to the ground layer 33 at the second surface 31b of the dielectric substrate 31.

Further, in the present embodiment as shown FIG. 6, the antenna 17 comprises the termination resistor 35 provided at a position adjacent to the other via hole 31c of the second surface 31b of the dielectric substrate 31 in the first direction. The termination resistor 35 is connected to the other end of the line 32 through the via hole 31c. The termination resistor 35 is, for example, partially connected to the ground layer 33 on the second surface 31b of the dielectric substrate 31. The termination resistor 35 is set to a resistance value corresponding to the characteristic impedance of the line 32.

Such antennas 17 are, for example, arranged so as to be spaced apart from each other in a direction orthogonal to both the conveyance direction C and the width direction of the mount 120 from the conveyance path. Note that the distance away from the conveyance path of the antenna 17 is appropriately set according to the electric field intensity of the antenna 17. For example, the antenna 17 is disposed to be spaced apart from the conveyance path by 15 mm. The antenna 17 is arranged in a posture in which the first direction is orthogonal to the conveyance path. Further, the antenna 17 is disposed at a position where the center of the antenna 17 in the first direction is a center in the width direction of the conveyance path. That is, the RFID tag 111 passes along the conveyance path and passes through the center side in the first direction of the antenna 17.

The reader/writer 18 controls the antenna 17 and performs data wireless communication with the RFID tag 111. In one example, the reader/writer 18 causes the antenna 17 to emit a radio wave (or radio waves) and receives the radio waves from the antenna 17. In this way, the reader/writer 18 communicates with the RFID tag 111 and writes and reads the RFID tag 111. In one example, the reader/writer 18 causes the antenna 17 to emit an unmodulated wave as a radio wave in order to perform wireless communication with the RFID tag 111. The RFID tag 111 that has received the unmodulated wave starts up and transmits a response wave to the antenna 17. Therefore, the reader/writer 18 receives the response wave through the antenna 17 and communicates with the RFID tag 111. In addition, for example, when writing data to the RFID tag 111, the reader/writer 18 performs amplitude modulation on a carrier wave that is emitted from the antenna 17 to encode the written data.

The print head 19 is arranged to face the platen roller 12 with the conveyance direction C interposed therebetween. The print head 19 is connected to the head driver 20. The print head 19 prints on a printing surface of the conveyed label 110, that is, a surface opposite to the surface on which the RFID tag 111 is provided.

The head driver 20 drives the print head 19 based on print data and the like to print on the printing surface of the label 110. The movement mechanism driver 21 moves the print head 15A back and forth along one direction adjacent to the label paper 100 transported through the conveyance path.

Note that the display 22 may further include an LED or the like and may have a speaker or the like capable of notifying information by sound.

The input unit 23 is, for example, a touch panel provided in or integrated with the display 22. Note that the input unit 23 may be a keyboard, a pointing device, a touch panel, or the like provided in a housing of the RFID tag issuing apparatus 1.

The communication interface 24 is an interface for communicating with an external device or control device. The communication interface 24 receives data to be written to the RFID tag 111 and print data to be printed on the label 110 from the external or control device. In addition, the communication interface 24 transmits data such as issuance result data to the external or control device.

The storage unit 25 stores a program (or programs) required to control the RFID tag issuing apparatus 1, and various kinds of data, such as print data and issuance result data. The storage unit 25 is, for example, a Read Only Memory (ROM), a Random Access Memory (RAM), a Solid State Drive (SSD), or the like. The processor 26 is, for example, a central processing unit (CPU). The processor performs various operations on data or the like based on the program(s) stored in the storage unit 25 or the memory. By executing the program(s), the processor functions as a control unit or controller that is capable of executing various operations according to program instructions.

The processor 26 is connected to the motor driver 14, the sensor signal input unit 16, the reader/writer 18, the head driver 20, the movement mechanism driver 21, the display 22, the input unit 23, the communication interface 24, and the storage unit 25. The processor 26 controls each configuration in accordance with the signal input from the sensor signal input unit 16, the program stored in the storage unit 25, and the like, thereby realizing the function of the RFID tag issuing apparatus 1. For example, the processor 26 controls the reader/writer 18 to control reading and writing of the RFID tag 111 via the antenna 17.

According to the RFID tag issuing apparatus 1 configured as described above, the width WG2 of the ground layer 33 of the antenna 17 is set to be the same width as the maximum width WL2 of the line 32 in the second direction, and thus, as illustrated in FIG. 9, the electric field intensity of the antenna 17 can be increased.

As a result, even when the antenna 17 is downsized, it is possible to achieve an electric field intensity similar to that of the antenna 17 before the downsizing. This enables the antenna 17 to suitably emit a radio wave. Even if the RFID tag issuing apparatus 1 is miniaturized, the antenna 17 can still perform the desired communication with the RFID tag 111. Consequently, effective downsizing of the antenna 17 and the RFID tag issuing apparatus 1 becomes possible.

As described above, according to the antenna 17 and the RFID tag issuing apparatus 1 according to the present embodiment, it is possible to suitably emit a radio wave (or radio waves) even when the antenna 17 and the RFID tag issuing apparatus 1 are made smaller.

Note that the antenna 17 and the RFID tag issuing apparatus 1 are not limited to the above-described embodiments and examples. In general, so long as the maximum width WL1 of the line 32 in the first direction is set to be larger than the maximum width WL2 of the line 32 in the second direction and also the width WG2 of the ground layer 33 in the second direction is set to be the same as the maximum width WL2 of the line 32 in the second direction, the line 32 is not limited to the shape of the above-described embodiment. Hereinafter, various examples of modifications of the line 32 will be described with reference to FIGS. 10 to 12. For simplicity of explanation, the via hole 31c, the feeding point 34, and the termination resistor 35 are omitted from the depicted antennas in FIG. 10, FIG. 11, and FIG. 12.

Figure 10:
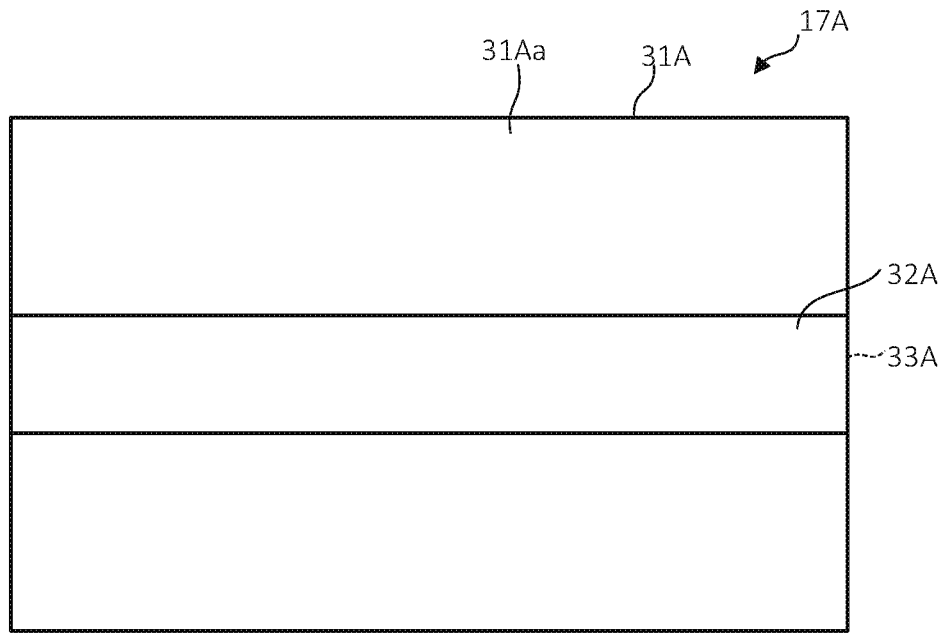
FIG. 10 depicts a configuration of an antenna according to a first modified example.

First, an antenna 17A according to a first modified example will be described with reference to FIG. 10. As shown in FIG. 10, the antenna 17A includes a line 32A formed in a linear shape and a ground layer 33A formed in a rectangular shape having the same shape as that of the line 32A. The line 32A has one end disposed on one end side (a first end side) of the dielectric substrate 31A in the first direction=and another end disposed on the opposite end side (or second end side) of the dielectric substrate 31A in the first direction. That is, the line 32A extends linearly along the first direction from the first end side to the second end side of the dielectric substrate 31.

In a similar manner to the antenna 17 shown in FIG. 7, in the antenna 17A a width of the line 32A in the second direction (a maximum width) and a width of the ground layer 33A in the second direction are equal to each other. With this configuration, the antenna 17A can increase the electric field intensity and can suitably emit radio waves even if the antenna 17A is made smaller.

Figure 11:
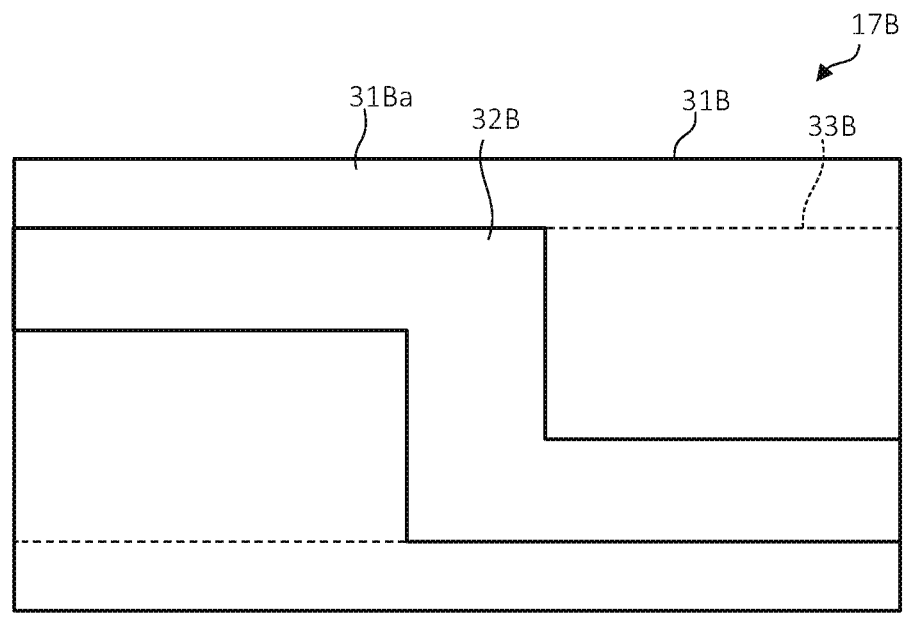
FIG. 11 depicts a configuration of an antenna according to a second modified example.

Next, an antenna 17B according to a second modified example will be described with reference to FIG. 11. As shown in FIG. 11, a line 32B of the antenna 17B first extends from the first end side to the center side of the dielectric substrate 31B in the first direction. It then bends 90° and extends in the second direction. Further, the line 32B bends 90° and extends toward the second end side of the dielectric substrate 31B in the first direction. The ground layer 33B of the antenna 17B has its width in the second direction equal to the maximum width of the line 32A in the second direction.

Thus, in a similar manner to the antenna 17 shown in FIG. 7, the antenna 17B can increase the electric field intensity and can suitably emit radio waves even if the antenna 17B is made small.

Figure 12:
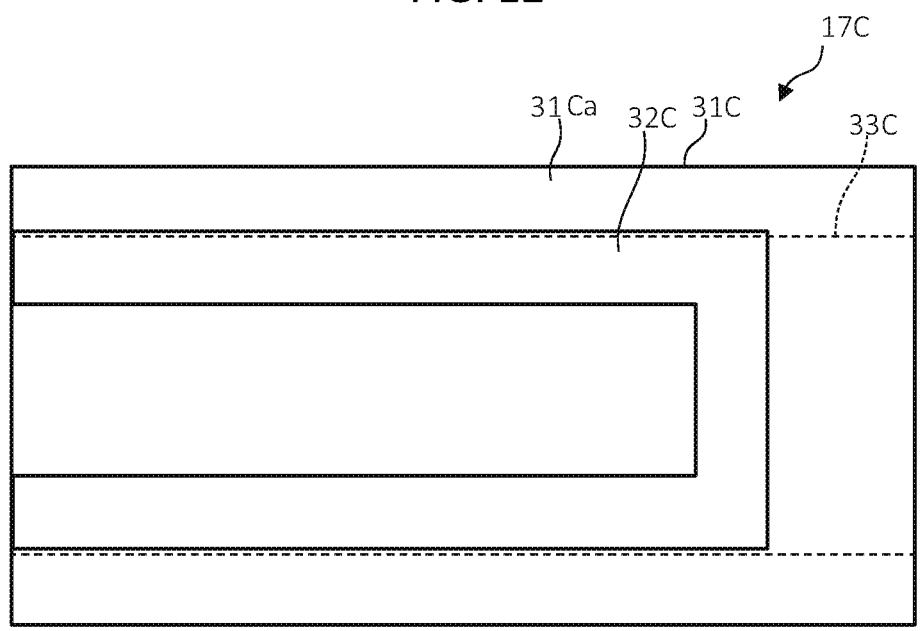
FIG. 12 depicts a configuration of an antenna according to a third modified example.

Next, an antenna 17C according to a third modified example will be described with reference to FIG. 12. As shown in FIG. 12, the antenna 17C includes a line 32C and a ground layer 33. The line 32C extends along the first direction, folds back by bending 90° at two positions, and extends again in the first direction. Both ends of the line 32C are on the first end side of the dielectric substrate 31 in the first direction. The ground layer 33C has a width in the second direction equal to the maximum width of line 32C in the second direction.

More specifically, the line 32C of the antenna 17C extends linearly along the first direction from the first end side of the dielectric substrate 31C in the first direction (that is the same position as the first end side of the dielectric substrate 31C in the second direction) toward the second end side of the dielectric substrate 31C in the first direction. The line 32C then bends 90° and extends in the second direction. The line 32C bends 90° again and extends back toward the first end side of the dielectric substrate 31 in the first direction. Finally, the line 32C ends at the first end side of the first direction.

In a similar manner to the antenna 17 shown in FIG. 7, the antenna 17C having a configuration as described above can increase the electric field intensity and can suitably emit radio waves even if the antenna 17C is made smaller.

Figure 13:
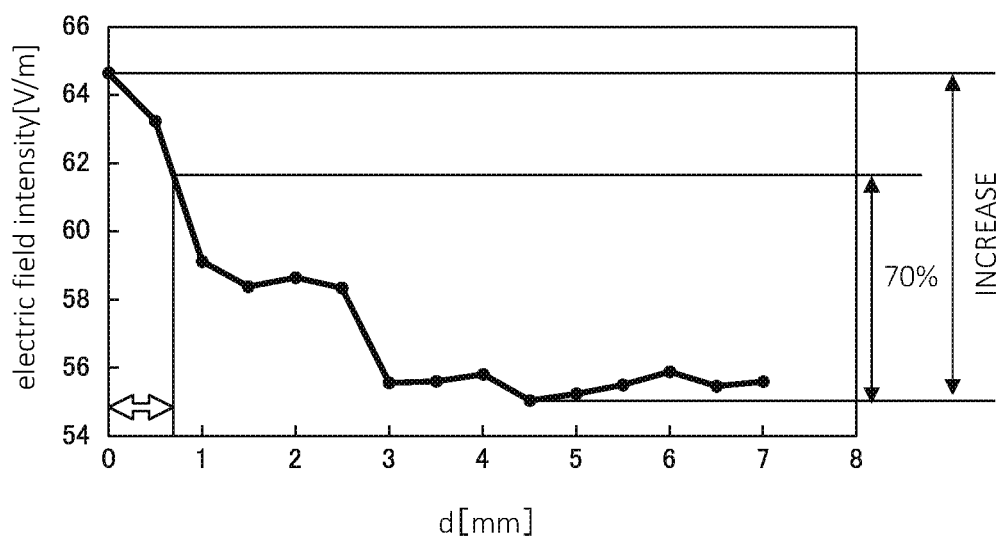
FIG. 13 shows an example of a relationship between a configuration of an antenna and an electric field intensity according to an embodiment.

Next, an example of a relationship between the configuration of the antenna 17C the electric field intensity as illustrated in FIG. 13 will be described. In FIG. 13, the relationship between the configuration of the antenna 17C (that is, the configuration of the maximum width WL2 of the line 32 in the second direction and the width WG2 of the ground layer 33 in the second direction) and the electric field intensity calculated by the electromagnetic field simulator.

Note that the conditions for calculating the electric field intensity by the electromagnetic field simulator according to the present example are the following. The width W1 of the dielectric substrate 31 in the first direction is set at 50 mm, the width W2 of the dielectric substrate 31 in the second direction is set at 30 mm, and the maximum width WL2 of the line 32 in the second direction is set at 16 mm. Further, the width WG2 of the ground layer 33 in the second direction is set as WG2=WL2+2d, and d is incremented by 0.5 mm from d=0 to d=7 mm, and the electric field intensity at a position separated by 15 mm from the center of the antenna 17 was calculated.

As shown in FIG. 13, the antenna 17C of FIG. 12 using the line 32C as described above achieves the same effects as those achieved by the antenna 17 of FIG. 7. When d=0 mm (that is, WG2=WL2), the electric field intensity becomes the highest, and as d increases, the electric field intensity decreases. After d=3 mm, the electric field intensity becomes substantially level. The electric field intensity reaches the smallest value at d=4.5 mm. Therefore, the difference between the electric field intensity at d=0 mm and the electric field intensity at d=4.5 mm is considered to correspond to the 100% increase in the electric field intensity. The width at which the increase in electric field intensity is 70% or more is about d=0.7 mm.

In this example, the width WG2 of the ground layer 33C with respect to the maximum width WL2 of the line 32C in which the "increase in electric field intensity" is 70% or more is in the range of 16 mm WG2<17.4 mm. Also, as is apparent from the results of the calculations, the electric field intensity can be improved by making the maximum width WL2 of the line such as the lines 32, 32A, 32B, and 32C (hereinafter collectively referred to as the line 32) and the width WG2 of the ground layer such as the ground layers 33, 33A, 33B, and 33C (hereinafter collectively referred to as the ground layer 33) equal to each other, regardless of the shape of the line 32 of the antenna.

Figure 14:
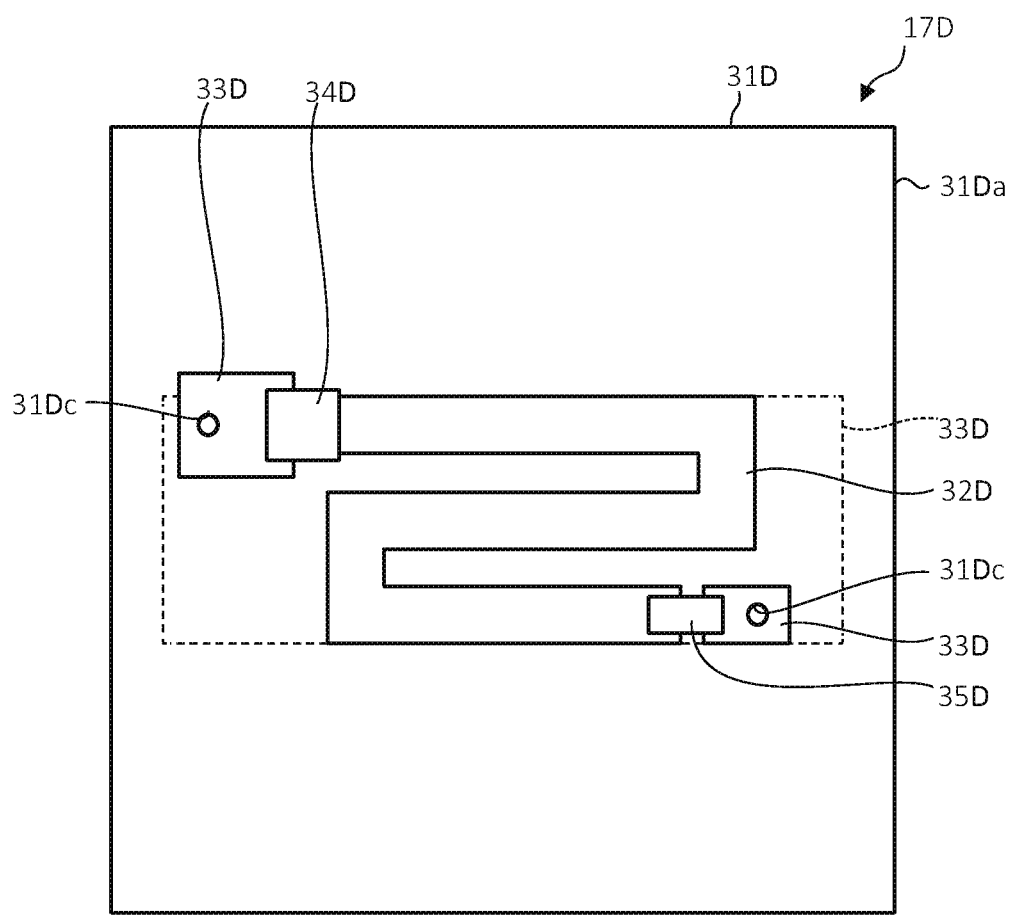
FIG. 14 depicts a configuration of an antenna in a plan view according to an embodiment.

While the dielectric substrates 31, 31A, 31B, and 31C (hereinafter collectively referred to as the dielectric substrate 33) have been illustrated as having a rectangular plate shape elongated in one direction, its shape is not limited thereto. For example, an antenna 17D according to another embodiment as illustrated in FIG. 14 has a dielectric substrate 31D of a square plate shape.

In the embodiment shown in FIG. 6, the antenna 17 has a configuration in which the feeding point 34 and the termination resistor 35 are provided on the second surface 31b of the dielectric substrate 31. The configuration is not limited thereto. For example, in the antenna 17D as shown in FIG. 14 according to another embodiment, a feeding point 34D (or simply referred to as a feeding point) and a termination resistor 35D are provided on the first surface 31Da of the dielectric substrate 31D.

In this case, the ground layer 33D may be provided in the area around the via hole 31Dc of the first surface 31Da, leaving an open space for the via hole 31Dc, and the feeding point 34D and the termination resistor 35D may be connected to the ground layer 33D.

As another example of the antenna 17, one of the feeding point 34 (or 34D) and the termination resistor 35 (or 35D) may be provided on the first surface 31a of the dielectric substrate 31, and the other of the two may be provided on the second face 31b of the dielectric substrate 31.

In the embodiments and examples as shown in FIGS. 4-13, the antenna 17 has been described to have the width W1 of the dielectric substrate 31 and the width WG1 of the ground layer 33 are set to be equal to each other. The configuration, however, is not limited thereto. For example, as shown in FIG. 14, if the feeding point 34D and the termination resistor 35D are connectable to the ground layer 33D, the width WG1 of the ground layer 33D may be equal to or greater than the maximum width WL1 of the line 32D and smaller than the width W1 of the dielectric substrate 31d.

While in the above-described embodiments and examples, the antenna 17 has been described as having the configuration applicable to the RFID tag issuing apparatus 1, its application is not limited thereto. The antenna 17 can be applied to various types of the RFID tag issuing apparatus or other devices suitable for accommodating or handling the antenna 17. For example, the antenna 17 can be applied to a device that does not perform printing on the label 110 of the label paper 100, or alternatively, the RFID tag issuing apparatus 1 may not perform printing on the label 110.

According to the antenna and the RFID tag issuing apparatus of the above-described embodiments and examples, it is possible to suitably emit a radio wave even if the antenna is made smaller.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. An antenna, comprising:
   a dielectric substrate;
   a line on a first surface of the dielectric substrate, a maximum width WL1 of the line in a first direction of the first surface being greater than a maximum width WL2 of the line in a second direction orthogonal to the first direction;
   a ground layer on a second surface of the dielectric substrate, a width WG2 of the ground layer in the second direction being equal to the maximum width WL2 of the line in the second direction; and
   a termination resistor connected at an end of the line.

2. The antenna according to claim 1, wherein
   a first end of the line is on a first end side of the first surface in the first direction, and
   a second end of the line is on the first end side or a second end side of the first surface in the first direction.

3. The antenna according to claim 2, wherein the line bends at multiple positions and extends in the first direction multiple times on the first surface of the dielectric substrate.

4. The antenna according to claim 2, wherein the line extends in the first direction, then bends in the second direction, and again extends in the first direction.

5. The antenna according to claim 2, further comprising:
   a feeding point at the first end of the line, wherein
   the termination resistor is at the second end of the line, the termination resistor having a resistance value corresponding to a characteristic impedance of the line.

6. The antenna according to claim 5, wherein the feeding point and the termination resistor are on the second surface of the dielectric substrate.

7. The antenna according to claim 5, wherein the ground layer avoids a region around the feeding point and the termination resistor.

8. The antenna according to claim 5, wherein the feeding point and the termination resistor are on the first surface of the dielectric substrate.

9. The antenna according to claim 1, wherein the maximum width WL1 of the line in the first direction is equal to or less than a width W1 of the dielectric substrate in the first direction.

10. The antenna according to claim 1, wherein the maximum width WL2 of the line in the second direction is less than a width W2 of the dielectric substrate in the second direction.

11. The antenna according to claim 1, wherein a width WG1 of the ground layer in the first direction is equal to or greater than the maximum width WL1 of the line in the first direction and equal to or less than the width W1 of the dielectric substrate in the first direction.

12. The antenna according to claim 1, wherein the width WG2 of the ground layer in the second direction is less than a width W2 of the dielectric substrate in the second direction.

13. The antenna according to claim 1, wherein the maximum width WL2 of the line in the second direction and the width WG2 of the ground layer in the second direction are set such that the antenna achieves a predetermined increase in the electric field intensity.

14. The antenna according to claim 13, wherein the increase in the electric field intensity is at least 70% of a difference between the electric field intensity when the width WG2 is equal to the maximum width WL2 and the lowest electric field intensity when the width WG2 is larger than the maximum width WL2, where the maximum difference is defined as 100%.

15. The antenna according to claim 1, wherein the ground layer is in a region of the second surface corresponding to the line on the first surface.

16. The antenna according to claim 1, further comprising:
    a plurality of via holes formed through the dielectric substrate.

17. An antenna, comprising:
    a dielectric substrate;
    a line on a first surface of the dielectric substrate; and
    a ground layer on a second surface of the dielectric substrate, wherein
    a termination resistor is on the dielectric substrate and connected at an end of the line,
    a maximum width WL1 of the line in a first direction is greater than a maximum width WL2 of the line in a second direction orthogonal to the first direction,
    a width WG2 of the ground layer in the second direction is equal to the maximum width WL2 of the line in the second direction, and
    a width WG1 of the ground layer in the first direction is equal to or greater than the maximum width WL1 of the line in the first direction and is equal to or less than the width W1 of the dielectric substrate in the first direction.

18. The antenna according to claim 17, wherein
    a first end of the line is on a first end side of the first surface in the first direction, and
    a second end of the line is on the first end side or a second end side of the first surface in the first direction.

19. An RFID tag issuing apparatus, comprising:
    an antenna comprising:
        a dielectric substrate;
        a line on a first surface of the dielectric substrate, a maximum width of the line in a first direction of the first surface being greater than a maximum width of the line in a second direction orthogonal to the first direction;
        a ground layer on a second surface of the dielectric substrate, a width of the ground layer in the second direction being equal to the maximum width of the line in the second direction; and
        a termination resistor connected at an end of the line; and
    a reader/writer configured to communicate with an RFID tag via the antenna.

20. The RFID tag issuing apparatus according to claim 19, wherein
    a first end of the line is on a first end side of the first surface in the first direction, and
    a second end of the line is on the first end side or a second end side of the first surface in the first direction.

* * * * *